(12) United States Patent
Kuipers et al.

(10) Patent No.: US 7,419,648 B2
(45) Date of Patent: Sep. 2, 2008

(54) PROCESS FOR THE PRODUCTION OF HYDROGEN AND CARBON DIOXIDE

(75) Inventors: Johannes Alfonsius Maria Kuipers, Enschede (NL); Charudatta Subhash Patil, Enschede (NL); Martin Van Sint Annaland, Enschede (NL)

(73) Assignee: Shell Oil Company, Houston, TX (US)

( * ) Notice: Subject to any disclaimer, the term of this patent is extended or adjusted under 35 U.S.C. 154(b) by 379 days.

(21) Appl. No.: 10/893,466

(22) Filed: Jul. 16, 2004

(65) Prior Publication Data

US 2006/0013762 A1    Jan. 19, 2006

(51) Int. Cl.
*C01B 31/20* (2006.01)
*C01B 3/26* (2006.01)

(52) U.S. Cl. .................... 423/437.1; 423/650; 423/651; 423/652

(58) Field of Classification Search ................. 423/650, 423/651, 652, 653, 654, 437.1
See application file for complete search history.

(56) References Cited

U.S. PATENT DOCUMENTS

| | | | | |
|---|---|---|---|---|
| 3,304,249 | A * | 2/1967 | Katz ........................... | 204/164 |
| 4,877,550 | A | 10/1989 | Goetsch et al. ............. | 252/373 |
| 5,326,550 | A | 7/1994 | Adris et al. .................. | 423/652 |
| 5,741,474 | A | 4/1998 | Isomura et al. ........... | 423/648.1 |
| 5,846,641 | A * | 12/1998 | Abeles et al. ............ | 428/312.8 |
| 5,861,137 | A | 1/1999 | Edlund ....................... | 423/652 |
| 5,938,800 | A | 8/1999 | Verrill et al. ............... | 48/127.9 |
| 6,235,417 | B1 * | 5/2001 | Wachsman et al. ............ | 429/17 |
| 6,331,283 | B1 * | 12/2001 | Roy et al. .................... | 423/652 |
| 6,348,278 | B1 | 2/2002 | LaPierre et al. ............... | 429/17 |
| 6,461,408 | B2 | 10/2002 | Buxbaum ...................... | 95/55 |
| 6,730,285 | B2 * | 5/2004 | Aasberg-Petersen et al. .......................... | 423/652 |
| 2003/0039601 | A1 * | 2/2003 | Halvorson et al. .......... | 422/198 |

(Continued)

FOREIGN PATENT DOCUMENTS

WO    WO02070402    9/2002

(Continued)

OTHER PUBLICATIONS

Patil, Charudatta S. et al, "Design of a Novel Autothermal Membrane-Assisted Fluidized-Bed Reactor for the Production of Ultrapure Hydrogen from Methane", Ind. Eng. Chem. Res., vol. 44, pp. 9502-9512 (2005).

(Continued)

*Primary Examiner*—Wayne A. Langel

(57) ABSTRACT

The present invention pertains to a process for the production of hydrogen and carbon dioxide from hydrocarbons involving:
a) supplying a gaseous stream of hydrocarbons and a molecular-oxygen containing gas to a first reaction zone having a fluidized bed of partial oxidation catalyst;
b) catalytically partially oxidizing the hydrocarbons in the gaseous stream at a temperature in the range of from 700° C. to 1400° C., to form a first effluent;
c) supplying a gaseous stream of hydrocarbons, steam and the first effluent to a second reaction zone containing a fluidized bed of steam reforming catalyst;
d) catalytically reforming the hydrocarbons fed to the second reaction zone at a temperature in the range of from 200° C. to 700° C.;
e) separating hydrogen from the reformed gas by a selective membrane in the second reaction zone; and,
f) removing a gaseous stream rich in carbon dioxide.

9 Claims, 1 Drawing Sheet

U.S. PATENT DOCUMENTS

2004/0018144 A1* 1/2004 Briscoe ............... 423/652
2004/0101472 A1* 5/2004 Kurimura et al. ........... 423/650
2005/0036940 A1* 2/2005 Grace et al. ............... 423/652

FOREIGN PATENT DOCUMENTS

WO   WO2005033003   4/2005

OTHER PUBLICATIONS

Witjens, L.C., Synthesis and CHaracterization of Pd/Ag Membranes for Hydrogen Separation, PhD Thesis, Univ. of Utrecht, The Netherlands, 2004.
Krumpelt, M. et al, Fuel Processing for Fuel Cell Systems in Transportation and Portable Power Applications, Cat. today 2002, 77, 3-16.
Song, C., Fuel Processing for Low Temperature and High Temperature Fuel Cells-Challenges, and Opportunities for Sustainable Development in the 21$^{st}$ Century, Cat. Today 2002, 77, 17-49.
Rostrup-Nielsen, J.R., In Catalytic Steam Reforming in Catalysis Science and Technology 5; Anderson, J.R. Boudart, M., Eds; Springer-Verlag: Berlin, 1984.
Adris, A.M. et al, A Fluidized Bed Membrane Reacotr for the Steam Reforming of Methane. Can. J. Chem. Eng., 1991, 69, 1061-1070.
Santos, A. et al, Partial Oxidation of Methane to Carbon Monoxide and Hydrogen in a Fluidized Bed Reactor, Cat. Today 1994, 21, 481-488.
Santos, A., et al, Oxidation of Methane to Synthesis Gas in a Fluidized Bed Reactor USing MgO based Catalysts, J. Catal., 1996, 158, 83-91.
Adris, A.M. et al, The Fluidized Bed Membrane Reactor for Steam Methane Reforming: Model Verification and Parametric Study, Chem. Eng. Sci. 1997, 52, 1609-1616.
Roy, S., "Fluidized Bed Steam Methane Reforming with High Flux Membrane and Oxygen Input", PhD Thesis, Univ. of Calgary, Calgary, Canada, 1998 (Thesis).
Adris, A.M. ert al, Charateristics of Fluidized-Bed Membrane Reactors: Scale-up and Practical Issues, Ind. Eng. Chem. Res., 1997, 36, 4549-4556.
Bharadwaj, S. S. et al, "Catalytic Partial Oxidation of Natural Gas to Syngas", Fuel Process Technol., 1995, 42, 109-127.
Wilheim, D.J. et al, Syngas Production for Gas to Liquid Applications: Technologies, Issues and Outlook, Fuel Process, Technol. 2001, 71, 139-148.
Rostrup-Nielsen, J.R., Syngas in Perspective, Cat. Today, 2002, 71, 243-247.
Roy, S., Fluidized Bed Steam Methane Reforming With Oxygen Input, Chem. Eng. Sci., 1999, 54, 2095-2102.
Grace, J.R. et al, Equilibrium Modeling of Catalytic Steam Reforming of Methane in Membrane Reacots With Oxygen Addition, Catal. Today, 2001, 64, 141-149.
Chen, Z. et al, Simulation for Steam Reforming of Natural Gas with Oxygen Input in a Novel Membrane Reformer, Fuel Process Technol., 2003, 83 235-252.
Balachandran, U. et al, Ceramic membrane Reactor for Converting Methane to Syngas, Catal. Today, 1997, 36, 265-272.
Tsai, C.Y. et al, Dense Perovskite Membrane Reactors for Partial Oxidation of Methane to Syngas, AIChE J. 1997, 43, 2741-2750.
Sammells, A.F. et al, Catalytic Membrane Reacotr for Spontaneous Synthesis Gas Production, Catal. Today 2000, 56, 325-328.
Kato, K. et al, BNubble Assemblage Model for Fluidized Bed Catalytic Reactors, Chem. Eng. Sci. 1969, 24, 1351-1369.
Deshmukh, S.A.R.K. et al, Development of a Membrane Assisted Fluidized Bed Reactor. 1. Gas-Phase Back-mixing and Bubble-to-Emulsion phase Mass Transfer Using Tracer Injection and Ultrasound Experiments, Ind. Eng. Chem. Res. 2005, 44, 5955-5965.
Deshmukh, S.A.R.K. et al, Development of a Membrane Assisted Fluidized Bed Reactor - 2. Experimental Demonstration and Modeling for the Partial Oxidation of Methanol, 44, 5966-5976.
Trimm, D.L. et al, The Combustion of Methane on Platinum-Alumina Fibre Catalysts. I. Kinetics and Mechanism. Chem. Eng. Sci. 1980, 35, 1450-1413.
Numaguchi, T. et al, Intrinsic Kinetics and Design Simulation in a Complex Reaction Network: Steam Methane Reforming, Chem. Eng. Sci., 1988, 43, 2295-2301.
Uemiya, S., Steam Reforming on Methane in a Hydrogen Permeable Membrane Reactor, Appl. Catal., 1991, 67, 223-230.
Shiau, C. et al, An Improved Bubble Assemblage Model for Fluidized Bed Catalytic Reactors, Chem. Eng. Sci. 1993, 48, 1299-1308.
Mori, S. et al Estimation of Bubble Diameter in Gaseous Fluidized Beds, AICheJ., 1975, 21, 109-115.
De Smet, C.R.H. et al, Design of Adiabatic Fixed Bed Reactors for the partial Oxidation of Methane to Synthesis Gas-Application to Production of Methanol and Hydrogen for Fuel Cells, Chem. Eng. Sci. 2001, 56, 4849-4861.
Orcutt, J.C., J.F. Davidson and Pigford, R.L., "Reation Time Distributionsin Fluidized Catalytic Reactors", (1962), Chem. Eng. Prog. Symp. Series, 38, 58:1-15.
Adris, A.M. et al, The Fluidized Bed Membrane Reactor for Stream Methane Reforming: Model Verification and Parametric Study, Chem. Eng. Sci. 1997, 52, pp. 1609-1622.

* cited by examiner

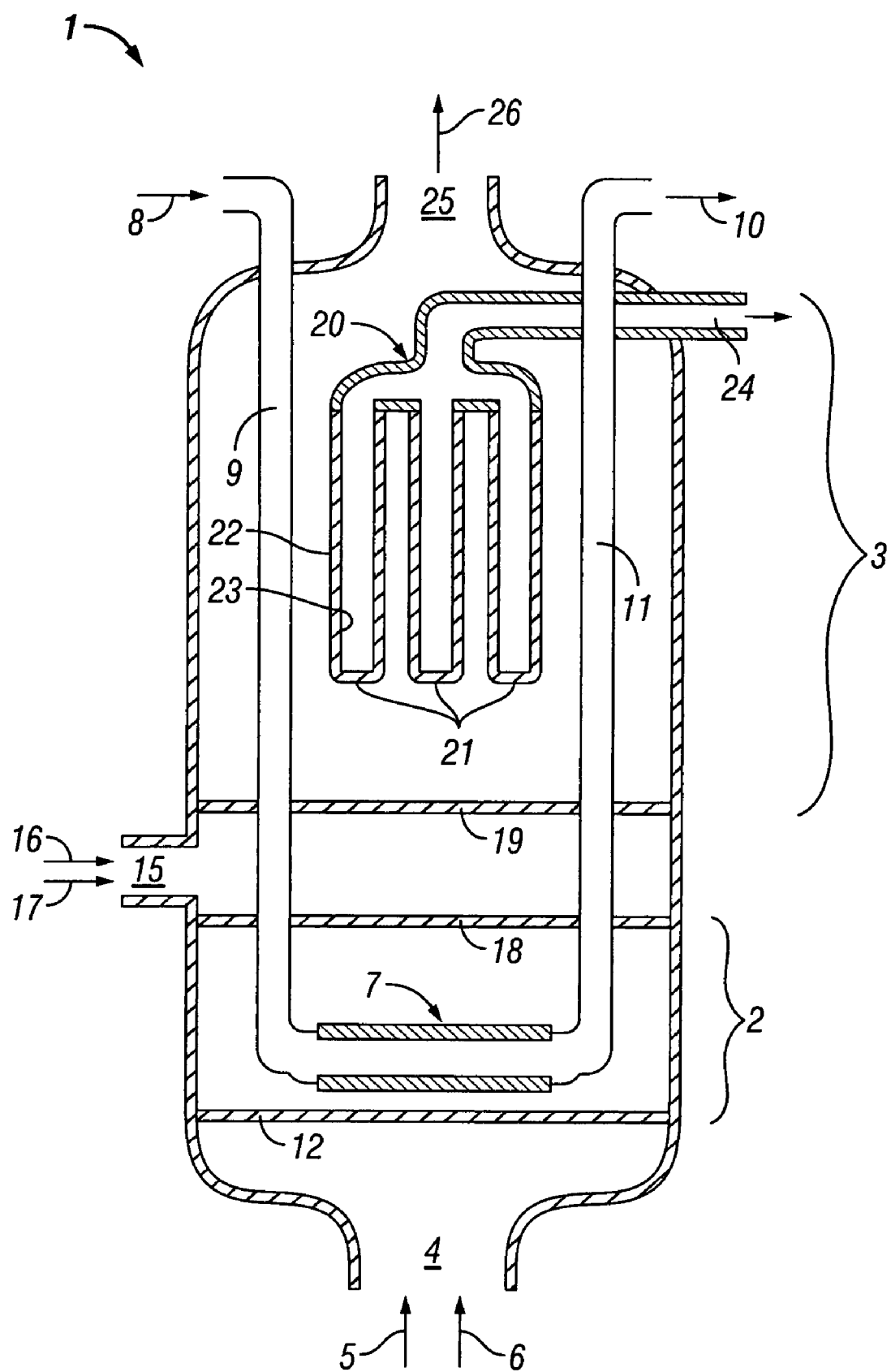

PROCESS FOR THE PRODUCTION OF HYDROGEN AND CARBON DIOXIDE

FIELD OF THE INVENTION

The present invention relates to a process for the production of hydrogen and carbon dioxide from hydrocarbons, to a reactor for such process, and to a fuel cell system comprising in series such reactor and a fuel cell.

BACKGROUND OF THE INVENTION

Hydrogen for fuel cells can be produced by means of fuel processing. In a fuel processor, a hydrocarbonaceous fuel is converted in a hydrogen-rich gas stream that can be used in a fuel cell for the generation of electricity. Typically in a fuel processor, the hydrocarbonaceous fuel is first reacted with oxygen and/or steam by means of catalytic partial oxidation, autothermal reforming, steam reforming, or a combination of one or more thereof to obtain a gas mixture comprising carbon oxides and hydrogen. The thus-obtained gas mixture is subsequently reacted with steam at a water-gas shift conversion catalyst to convert carbon monoxide into carbon dioxide with concurrent production of hydrogen. A gaseous stream comprising hydrogen and carbon dioxide is thus obtained. This stream may be fed to a fuel cell.

Fuel processors that integrate steam reforming of hydrocarbonaceous streams with selective hydrogen removal are also described in the art, for example in WO 02/070402, U.S. Pat. No. 5,938,800, U.S. Pat. No. 6,348,278, U.S. Pat. No. 5,861,137, and U.S. Pat. No. 5,741,474. Such integrated steam reforming/hydrogen separation devices operate at lower temperatures than conventional steam reforming reactors and are not limited by normal equilibrium limitations. In such integrated devices, hydrocarbons are reformed to carbon dioxide and hydrogen according to (in the case of methane):

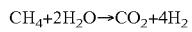
$$CH_4+2H_2O \rightarrow CO_2+4H_2$$

Advantages of such integrated steam reformers/hydrogen removal devices as compared to fuel processors without integrated hydrogen removal are that a substantially pure stream of hydrogen is obtained and that no separate reaction zone for the water-gas shift conversion is needed.

In WO 02/070402, a fuel processor comprising a membrane steam reforming reactor is disclosed. The membrane steam reforming reactor comprises a fixed bed of steam reforming catalyst and a hydrogen-selective, hydrogen-permeable membrane for removal of hydrogen from the fixed bed. The membrane steam reforming reactor is heated by a flameless distributed combustor.

In U.S. Pat. No. 5,741,474, a system for producing high-purity hydrogen is disclosed. The system comprises a reforming chamber provided with a fixed bed of catalyst for steam reforming and partial oxidation and a hydrogen-separating membrane. The heat possessed by the portion of reaction gas not permeable into the hydrogen-separating membrane and the heat generated by the exothermic partial oxidation are utilised for heating and reforming.

In U.S. Pat. No. 5,861,137 is described a steam reformer comprising a fixed bed of steam reforming catalyst surrounding at least part of a hydrogen-permeable, hydrogen-selective membrane and a fixed bed of catalytic combustion catalyst arranged around at least part of the fixed bed of steam reforming catalyst. The steam reforming bed is heated by the heat generated by the catalytic combustion of reforming byproduct gases.

In the integrated steam reforming/hydrogen removal processes of the prior art, a fixed bed of steam reforming catalyst is used. In a fixed bed of steam reforming catalyst, it is difficult to achieve an even distribution of the heat needed for the endothermic steam reforming reaction. Even distribution of a fixed bed requires special burners for distributed combustion and/or carefully designed steam reforming chambers, e.g. small annular chambers.

It would be desirable to find a process and reactor for the production of substantially pure hydrogen, wherein heat for the endothermic steam reforming reaction is efficiently provided to that reaction, and the carbon dioxide produced by the process is in a concentrated form.

SUMMARY OF THE INVENTION

The present invention is directed to a process for the production of hydrogen and carbon dioxide from hydrocarbons comprising:
a) supplying a first gaseous stream of hydrocarbons, a molecular-oxygen containing gas and, optionally, steam to a first reaction zone comprising a fluidized bed of partial oxidation catalyst;
b) catalytically partially oxidizing the hydrocarbons in the first gaseous stream in the first reaction zone at a temperature in the range of from 700° C. to 1400° C., to form a first effluent comprising carbon oxides, steam, and hydrogen;
c) supplying a second gaseous stream of hydrocarbons, steam and the first effluent to a second reaction zone comprising a fluidized bed of steam reforming catalyst;
d) catalytically reforming the hydrocarbons fed to the second reaction zone in the second reaction zone at a temperature in the range of from 200° C. to 700° C., to produce a reformed gas comprising hydrogen and carbon dioxide;
e) separating hydrogen from the reformed gas by a hydrogen-permeable selective membrane that is located in the second reaction zone; and,
f) removing a gaseous stream rich in carbon dioxide from the second reaction zone as the second effluent.

The present invention is also directed to a reactor for the production of hydrogen and carbon dioxide from hydrocarbons comprising a first and a second reaction zone in series, the first reaction zone located below the second reaction zone, wherein the first reaction zone is a reaction zone for the partial oxidation of hydrocarbons in a fluidized catalyst bed, the second reaction zone is a reaction zone for steam reforming of hydrocarbons in a fluidized catalyst bed, and a hydrogen-permeable selective membrane is located in the second reaction zone, the hydrogen-permeable selective membrane having a retentate side facing the catalyst bed and a permeate side, which reactor further comprises:
inlets for introduction of a first gaseous stream of hydrocarbons, a molecular-oxygen containing gas, and, optionally, steam into the first reaction zone;
inlets for the introduction of a second stream of hydrocarbons and steam between the first and the second reaction zone;
an outlet for hydrogen that is in fluid communication with the permeate side of the hydrogen-permeable selective membrane; and
an outlet for discharging a gaseous stream rich in carbon dioxide from the second reaction zone.

In a still further aspect, the invention relates to a fuel cell system comprising in series such reactor and a fuel cell having an inlet for hydrogen, wherein the inlet for hydrogen of the fuel cell is in fluid communication with the outlet for hydrogen of the reactor.

BRIEF DESCRIPTION OF THE DRAWING

The FIGURE shows a longitudinal section of a reactor according to the invention.

DETAILED DESCRIPTION OF THE INVENTION

The invention is directed to an autothermal process wherein steam reforming of hydrocarbons is performed in a fluidized bed of steam reforming catalyst provided with a hydrogen-selective, hydrogen-permeable membrane for removal of hydrogen from the catalyst bed and wherein the heat needed for the endothermic steam reforming reaction is provided by the reaction heat of the catalytic partial oxidation of part of the hydrocarbons in a fluidized bed located below the steam reforming catalyst.

In the process according to the invention, two fluidized catalyst beds are located in series. The first bed is a fluidized bed for exothermal partial oxidation of hydrocarbons, the second bed is a fluidized bed for endothermal steam reforming of hydrocarbons. The first bed is located below and upstream of the second bed. A hydrogen-permeable selective membrane is located in the second bed to remove the hydrogen formed from the second bed. By removing hydrogen from the second bed, hydrocarbon conversion is completed by shifting the reaction equilibrium towards the products hydrogen and carbon dioxide.

The overall reaction of the two beds is an autothermal reforming reaction. In the case of methane as hydrocarbon feedstock, the overall reaction equation is:

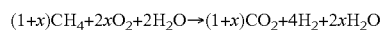
$(1+x)CH_4 + 2xO_2 + 2H_2O \rightarrow (1+x)CO_2 + 4H_2 + 2xH_2O$ wherein x has a value between 0 and 1, typically in the range of from 0.20 to 0.25, and is a function of reaction temperature.

A first gaseous stream of hydrocarbons, a molecular-oxygen containing gas, and preferably also steam are supplied to a first reaction zone comprising a fluidized bed of partial oxidation catalyst. In the first reaction zone, the hydrocarbons are partially oxidized and carbon oxides, hydrogen, and steam are formed. The partial oxidation reaction in the first reaction zone may be an exothermic direct partial oxidation reaction or an exothermic combustion reaction followed by an endothermic reforming reaction resulting in an overall exothermic partial oxidation of the hydrocarbons. The effluent of the first reaction zone, i.e. a gaseous mixture of carbon oxides, hydrogen, steam and, optionally, some unreacted hydrocarbons, is, together with a second gaseous stream of hydrocarbons and additional steam, supplied to a second reaction zone comprising a fluidized bed of steam reforming catalyst. The hydrocarbons fed to the second fluidized bed are catalytically reformed in that bed to form a hydrogen-containing reformed gas. The thus-formed hydrogen is separated in-situ from the reformed gas through a hydrogen-permeable selective membrane. A gaseous stream rich in carbon dioxide is removed from the second reaction zone as the second effluent.

Since hydrogen is continually removed from the reformed gas, the second reaction zone can be operated at a temperature that is lower than the reaction temperature of a conventional steam reforming reaction zone. The second reaction zone is typically operated at a temperature in the range of from 200° C. to 700° C., preferably of from 350° C. to 600° C.

The catalyst of the second fluidized catalyst bed may be any catalyst suitable for steam reforming. Such catalysts are known in the art. Typically, steam reforming catalysts comprise a group VIII metal as catalytically active material on a catalyst carrier, usually a refractory oxide carrier. Preferably, the Group VIII metal is nickel or a noble metal. Noble metals are particularly suitable as catalytically active material, since they are less prone to coking than nickel-comprising metals. In the case of the use of nickel as catalytically active metal, it might be necessary to regenerate the steam reforming catalyst of the second reaction after a certain period of operation.

The heat needed to operate the endothermic reforming reaction in the second reaction zone is supplied by the reaction heat of the first reaction zone. The first reaction zone is operated at a temperature in the range of from 700° C. to 1400° C., preferably from 800° C. to 1100° C. The partial oxidation reaction in the first reaction zone is an exothermic reaction. The effluent of the first reaction zone, i.e. the gaseous mixture comprising carbon oxides, hydrogen, and steam, that is supplied to the second reaction zone therefore has an elevated temperature and thus provides for the heat needed for the endothermic reforming reaction. The second gaseous stream of hydrocarbons and the additional steam that are supplied to the second reaction zone are preferably preheated to a temperature in the range of from 350° C. to 700° C. before being supplied to the second reaction zone.

Preferably, the first effluent, the second stream of hydrocarbons and the additional steam are mixed and evenly distributed over the whole cross-sectional area of the second reaction zone before being supplied to it. This may, for example, be achieved by placing a mixing device and/or a distribution screen between the first and the second reaction zone.

The first reaction zone comprises a fluidized bed of partial oxidation catalyst. A first gaseous stream of hydrocarbons, a molecular-oxygen containing gas and preferably also steam are supplied to the first reaction zone and the hydrocarbons are partially oxidized at a temperature in the range of from 700° C. to 1400° C., preferably from 800° C. to 1100° C.

Any catalyst suitable for partial oxidation may be used in the catalyst bed of the first reaction zone. Partial oxidation catalysts are known in the art. Typical partial oxidation catalysts comprise one or more Group VIII noble metals as catalytically active material. Rhodium, iridium, palladium and/or platinum are preferred, especially rhodium and/or iridium. The catalytically active metal is preferably supported on an inert high-temperature resistant support, usually a refractory oxide support. Typically, the catalyst comprises the catalytically active metal(s) in a concentration in the range of from 0.02% to 10% by weight, based on the total weight of the catalyst, preferably in the range of from 0.1% to 5% by weight. The catalyst may further comprise a performance-enhancing inorganic metal cation selected from aluminum, magnesium, zirconium, titanium, lanthanum, hafnium, silicon, barium, and cesium which is present in intimate association supported on or with the catalytically active metal, preferably a zirconium cation.

Preferred refractory oxides are zirconia-based, more preferably comprising at least 70% by weight zirconia, for example, selected from known forms of (partially) stabilized zirconia or substantially pure zirconia. Most preferred zirconia-based materials comprise zirconia stabilized or partially-stabilized by one or more oxides of magnesium, calcium, aluminum, yttrium, lanthanum or cesium.

It will be appreciated that the catalysts of both the first and the second reaction zone will have a particle size that is suitable for use in a fluidized bed. Suitable particles sizes are typically in the order of a few to a few hundreds of micrometers. The catalyst particles in the first and the second reaction zone may be diluted with a solid diluent.

The gases supplied to the first reaction zone are preferably preheated to a temperature in the range of from 200° C. to 700° C., more preferably from 350° C. to 600° C.

The different reactant gases (hydrocarbons, molecular-oxygen containing gas, steam) may be supplied to the first reaction zone as separate streams or as combined streams. It is important that the reactant streams are evenly distributed through the whole fluidized bed of catalyst. Therefore, mixers and/or distribution screens or the like may be used for even distribution of the stream(s) over the first reaction zone. Alternatively, one or more of the reactant streams may be supplied to the first reaction zone by means of an inlet nozzle having multiple injection points that is located in the fluidized bed. In a preferred embodiment of the process, the first gaseous stream of hydrocarbons and steam are combined and mixed before being supplied to the first reaction zone and the oxygen-containing gas is separately supplied to the fluidized bed by means of an inlet nozzle having multiple injection points, such as, for example, a porous tube located in the fluidized bed.

The amounts of reactant gases supplied to the first reaction zone are preferably such that the oxygen-to-carbon ratio of the combined gases supplied to the first reaction zone is in the range of from 0.30 to 0.80, more preferably from 0.40 to 0.70. References herein to the oxygen-to-carbon ratio refer to the ratio of oxygen in the form of molecules ($O_2$) to carbon atoms. The steam-to-carbon ratio of the combined gases supplied to the first reaction zone is preferably in the range of from 0.1 to 3.0, more preferably from 0.2 to 2.0, even more preferably from 0.3 to 1.0. References herein to the steam-to-carbon ratio refer to the ratio of steam in the form of molecules ($H_2O$) to carbon atoms.

The partial oxidation reaction in the first reaction zone operates on or near thermodynamic equilibrium conditions. This means that the effluent of the first reaction zone comprises carbon monoxide, carbon dioxide, steam, hydrogen and small amounts of unreacted hydrocarbons and oxygen.

The whole effluent of the first reaction zone is supplied, together with a second gaseous stream of hydrocarbons and additional steam, to the second reaction zone. The amounts of first effluent, second stream of hydrocarbons and additional steam are preferably such that the steam-to-carbon ratio of the combined gases supplied to the second reaction zone is in the range of from 2.0 to 10, more preferably from 3.0 to 7.0.

The overall ratio of oxygen-to-carbon that is supplied to the process is preferably in the range of from 0.10 to 0.70, more preferably from 0.35 to 0.65. The overall ratio of steam-to-carbon that is supplied to the process is preferably in the range of from 1.0 to 5.0, more preferably from 1.0 to 3.0.

The fraction of the total amount of hydrocarbons supplied to the process that is supplied to the first reaction zone is preferably in the range of from 0.4 to 0.8, more preferably from 0.5 to 0.7.

The process according to the invention may be operated at any suitable pressure, typically in the range of from 1 bar to 100 bar (absolute), preferably from 1 bar to 50 bar (absolute), more preferably from 3 bar to 30 bar (absolute). It will be appreciated that the pressure in the first reaction zone is slightly higher than in the second reaction zone in order to allow the first effluent to flow to the second reaction zone.

Any vaporizable stream of hydrocarbons may be used in the process according to the invention as the first and the second stream of hydrocarbons. The first and the second stream of hydrocarbons are preferably the same, but may be different from each other. The first and second stream of hydrocarbons may comprise any hydrocarbon that is gaseous under the operating conditions of the process of the invention. The streams may comprise oxygenated hydrocarbons, for example methanol or ethanol. The hydrocarbons may be liquid under Standard Temperature and Pressure conditions (STP; i.e. 0° C. and 1 atmosphere). Preferably, the first and the second stream comprise light hydrocarbons that are gaseous under STP conditions, for example natural gas, methane, ethane, propane, LPG or a mixture of two or more thereof. More preferably, the first and the second gaseous stream of hydrocarbons are natural gas.

The molecular-oxygen containing gas that is supplied to the first reaction zone may be air, oxygen-enriched air or substantially pure oxygen. Preferably, the molecular-oxygen containing gas is substantially pure oxygen. An advantage of the use of substantially pure oxygen is that the first and the second effluent are not diluted with nitrogen and that a more concentrated stream of carbon dioxide is obtained as the second effluent. Other advantages of the absence of nitrogen dilution are that the concentration gradient for permeation through the hydrogen-permeable selective membrane is higher and the reactor volume is considerable reduced.

In a preferred embodiment of the invention, substantially pure oxygen is supplied to the first reaction zone through a nonporous dense layer of Mixed Ionic Electronic Conductor (MIEC) that is located in the first reaction zone. Dense layers of MIEC are known in the art, for example from U.S. Pat. No. 5,846,641, which is herein incorporated by reference. Typically, a MIEC layer comprises a metallic oxide of the formula $ABO_{3-\delta}$, wherein A is one or more of calcium, strontium, barium, yttrium, and lanthanum, B is one or more of chromium, manganese, iron, cobalt, nickel, and copper, and $\delta$ ranges from 0 to 0.5. Such nonporous dense layers of metallic oxide are a fast conductor of both electronic species and oxygen anions at temperatures between 800° C. and 1000° C. through rapid bulk diffusion. The transport of oxygen through such layer occurs by a vacancy diffusion mechanism and is driven chemically by oxygen potential difference imposed across the dense layer. In the process according to the invention, the dense layer of MIEC is in the form of one or more tubes. Air is supplied to the inlet of each tube, for example via an air supply tube connected to one end of each tube, oxygen is transported through the MIEC layer in the form of oxygen anions, and oxygen-depleted air is discharged from each tube, for example via a discharge conduit connected to the other end of each tube. Each tube may comprise a MIEC layer supported on a substrate, for example porous alumina or zirconia, or may consist of an unsupported MIEC layer.

In an alternative embodiment, the molecular-oxygen containing gas may be supplied to the first reaction zone through one or more porous tubes located in the first reaction zone. Preferably, the porous tubes are of an oxygen-selective high-temperature resistant material that is more permeable for oxygen than for nitrogen. Zeolite molecular sieves such as for example ZSM-5, or mesoporous Vycor glass are examples of suitable materials for this purpose. In this embodiment, air is supplied to the inlet of the porous tube(s), for example via an air supply tube connected to one end of the tube(s), oxygen preferably permeates through the tube(s) to the first catalyst bed, and oxygen-depleted air is discharged from the tube(s), for example via a discharge conduit connected to the other end of the tube(s).

If air is supplied to oxygen-selective porous or nonporous tubes via an air inlet conduit, it is preferred that the air inlet conduit extends through the second reaction zone, in order to preheat the air. The oxygen-depleted air discharge conduit preferably extends through the second reaction zone in order to heat the second reaction zone.

The hydrogen-permeable selective membrane may be any hydrogen-permeable selective membrane known in the art. Examples of such membranes are microporous silica membranes or membranes comprising a thin layer of palladium- or platinum-containing film supported by a substrate. Membranes comprising a thin layer of palladium- or platinum-containing film supported by a substrate are particularly suitable for the process according to the invention. Such membranes are known in the art, for example from WO 02/070402 or U.S. Pat. No. 5,741,474, which is herein incorporated by reference.

The hydrogen-permeable selective membrane is located in the second reaction zone, preferably in the form of one or more tubes. The retentate side of the membrane is facing the fluidized bed of steam reforming catalyst. Hydrogen is selectively transported through the membrane to the permeate side of the membrane. The permeate side of the membrane is in fluid communication with an outlet for hydrogen. Hydrogen may be discharged from the permeate side of the membrane to the outlet for hydrogen by means of a sweep gas or a vacuum applied to it. Alternatively, the hydrogen may be discharged by connecting the outlet for hydrogen to a hydrogen inlet of a fuel cell. The separated hydrogen will then be directly fed as reactant gas to the fuel cell.

In the reactor according to the invention, the first and the second reaction zones may have the same or different diameters. Preferably, the diameter of the first reaction zone is smaller than the diameter of the second reaction zone, since the gas flow through the second reaction zone is larger than that through the first reaction zone and the reaction rates in the first zone are faster than the reforming reactions in the second zone.

The reactor according to the invention may be provided with an internal or external cyclone separator and catalyst recycle for separating catalyst particles from the second effluent and recycling them to the second reaction zone. Optionally, catalyst particles may be regenerated to remove coke deposits before being recycled to the reaction zone.

The reactor may be provided with mixers and/or distribution screens just upstream of the first reaction zone and just upstream of the second reaction zone.

The hydrogen that is separated from the second reaction zone is substantially pure and is therefore very suitable as fuel cell reactant. Therefore, the outlet for hydrogen of the reactor may be in fluid communication with an inlet for hydrogen of a fuel cell. Thus, the invention also relates to a fuel cell system comprising in series a reactor according to the invention and a fuel cell having an inlet for hydrogen, wherein the inlet for hydrogen of the fuel cell is in fluid communication with the outlet for hydrogen of the reactor. The fuel cell may be any fuel cell that uses hydrogen as reactant, for example a Solid Oxide Fuel Cell (SOFC) or a Proton Exchange Membrane (PEM) fuel cell, preferably a PEM fuel cell.

DETAILED DESCRIPTION OF THE DRAWING

In the FIGURE is shown a reactor 1 comprising a first reaction zone 2 and a second reaction zone 3 in series. The reactor has an inlet 4 for introduction of a first gaseous stream of hydrocarbons 5 and steam 6 to first reaction zone 2.

Oxygen is introduced in first reaction zone 2 through a bundle of tubes 7 (only one tube shown), each tube comprising a dense layer of MIEC. Air 8 is supplied to the in side of tube 7 via air supply conduit 9. Oxygen-depleted air 10 is discharged from tube 7 via discharge conduit 11. Both air supply conduit 9 and discharge conduit 11 extend through second reaction zone 3 in order to respectively preheat the air and cool the oxygen-depleted air. In this embodiment, the first gaseous stream of hydrocarbons 5 and steam 6 are mixed before being introduced to first reaction zone 2. Distribution screen 12 is placed in reactor 1, just below the first reaction zone in order to distribute the inlet stream evenly over first reaction zone 2 and to support the fluidized bed.

The reactor further has an inlet 15 for introduction of a second gaseous stream of hydrocarbons 16 and additional steam 17 to second reaction zone 3. A screen 18 is placed above first reaction zone 2 and below inlet 15 in order to prevent back-flow of the stream of hydrocarbons 16 and steam 17 to first reaction zone 2. Distribution screen 19 serves to support the fluidized bed of reforming catalysts and to create a positive flow in upward direction.

Membrane unit 20 comprising several tubes 21 of hydrogen-permeable selective membrane is located in second reaction zone 3. The tubes have a retentate side 22 at their outside that is facing the second reaction zone and a permeate side 23 at their inside. The permeate side 23 is in fluid communication with outlet 24 for hydrogen. The reactor further has an outlet 25 for discharging carbon dioxide rich gas 26 from second reaction zone 3.

EXAMPLE

The process according to the invention was operated in a reactor as depicted in the FIGURE, with first reaction zone 2 having a volume of $1.2 \times 10^{-3}$ m$^3$ (h=15 cm, d=10 cm) and a second reaction zone 3 having a volume of $3.1 \times 10^{-3}$ m$^3$ (h=40 cm, d=10 cm). First reaction zone 2 was filled with 100 g of partial oxidation catalyst. The partial oxidation catalyst was prepared by impregnating 300-500 µm particles of zirconia with an aqueous impregnation solution comprising rhodium trichloride, cerium nitrate and zirconyl nitrate. The impregnated particles were dried and calcined (2 hours at 700° C.). The resulting calcined particles comprised 1.1 wt % rhodium, 1.0 wt % cesium and 0.3 wt % zirconium on the zirconia support. Second reaction zone 3 was filled with 500 g of a steam reforming catalyst comprising platinum on alumina.

A stream of 1.38 mmol/s of methane and steam (0.83 mmol/s), both preheated to a temperature of 500° C., were introduced in first reaction zone 2 via inlet 4. Substantially pure oxygen was introduced in first reaction zone 2 at a flow of 0.74 mmol/s through a bundle of sixteen tubes 7 having a total surface area of 0.033 m$^3$. Each of tubes 7 was a commercially available tube of nonporous dense layer of mixed-conducting perovskite, i.e. a MIEC layer, of the composition (La,Ca)(Co,Fe) O$_3$ (OXYTUBE™; ex. HTCeramix SA, Lausanne, Switzerland).

First reaction zone 2 was operated at a temperature of 931° C. and a pressure of 5.0 bar (absolute).

A second stream of methane (0.63 mmol/s) and additional steam (2.44 mmol/s) were introduced in the reactor via inlet 15 and flow, together with the effluent from the first reaction zone 2 to second reaction zone 3. The composition, temperature and flow of the first effluent and of the inlet flow of the second reaction zone (combined first effluent, second methane stream and additional steam) are given in Table 1.

In second reaction zone 3, methane was steam reformed to form a hydrogen-containing reformate gas. The operating temperature in second reaction zone 3 was 500° C. The pressure in the second reaction zone was a few hundreds of mbars lower than the pressure in the first reaction zone (5 bar (absolute)) in order to allow the first effluent to flow to the second zone. In second reaction zone 3 was located a membrane unit 20 having 10 tubular hydrogen-selective, permeable membranes (only 3 tubes shown in the FIGURE). Each tube comprised a porous tantalum/niobium tube reinforced with Inconel that was coated on both the inside and the outside with a thin (5 μm) palladium layer. Hydrogen (6.18 mmol/s) permeated through the tubular hydrogen-selective, permeable membranes (total membrane surface area of $1.70 \cdot 10^{-2}$ m$^2$) and was thus separated from the reformed gas. A gaseous stream comprising 63% (mole/mole) of carbon dioxide was discharged from second reaction zone 3 via outlet 25 as the second effluent. The composition and flow of the second effluent is given in Table 1.

In steady state operation, the heat generated by the exothermic partial oxidation reaction in reaction zone 2 was sufficient to provide the heat needed for the steam reforming reaction in zone 3 and for the pre-heating of the reactants.

TABLE 1

FLOW AND COMPOSITION OF VARIOUS STREAMS

|  | 1$^{st}$ effluent | inlet flow in 2$^{nd}$ reaction zone | 2$^{nd}$ effluent |
| --- | --- | --- | --- |
| Flow (Nl/h) | 80 | 50 | 55 |
| Composition (mole %) |  |  |  |
| methane | 0.3 | 8.1 | 1.5 |
| Carbon monoxide | 23.2 | 14.3 | 2.0 |
| Carbon dioxide | 4.4 | 2.7 | 63.3 |
| water | 14.8 | 39.5 | 29.0 |
| hydrogen | 57.2 | 35.3 | 4.3 |
| oxygen | <0.01 | <0.01 | <0.01 |

We claim:

1. A process for the production of hydrogen and carbon dioxide from hydrocarbons comprising:
   a) supplying a first gaseous stream of hydrocarbons, substantially pure oxygen and, optionally, steam to a first reaction zone comprising a fluidized bed of partial oxidation catalyst, wherein substantially pure oxygen is supplied to the first reaction zone through a nonporous, dense layer of mixed ionic electronic conductor that is located in the first reaction zone, the dense layer forming a tube having a retentate side at the inside of the tube and a permeate side facing the catalyst bed, wherein air is fed to the inside of the tube via an air supply conduit that extends through a second reaction zone and the oxygen-depleted air is discharged from the inside of the tube via a discharge conduit that extends through the second reaction zone;
   b) catalytically partially oxidizing the hydrocarbons in the first gaseous stream in the first reaction zone at a temperature in the range of from 800° C. to 1100° C., to form a first effluent comprising carbon oxides, steam, and hydrogen;
   c) supplying a second gaseous stream of hydrocarbons, steam and the first effluent to the second reaction zone comprising a fluidized bed of steam reforming catalyst;
   d) catalytically reforming the hydrocarbons fed to the second reaction zone in the second reaction zone at a temperature in the range of from 200° C. to 700° C., to produce a reformed gas comprising hydrogen and carbon dioxide;
   e) separating hydrogen from the reformed gas by a hydrogen-permeable selective membrane that is located in the second reaction zone; and,
   f) removing a gaseous stream rich in carbon dioxide from the second reaction zone as the second effluent.

2. The process of claim 1, wherein the temperature in the second reaction zone is in the range of from 350° C. to 600° C.

3. The process of claim 1, wherein the pressure in the first and the second reaction zone is the range of from 1 bar absolute to 100 bar absolute.

4. The process of claim 1, wherein the ratio of oxygen molecules supplied to the first reaction zone to carbon atoms in the hydrocarbons supplied to the first and second reaction zones is in the range of from 0.10 to 0.70.

5. The process of claim 1, wherein the ratio of steam supplied to the first and second reaction zones and carbon atoms in the hydrocarbons supplied to the first and second reaction zones is in the range of from 1.0 to 5.0.

6. The process of claim 1, wherein the ratio between hydrocarbons supplied to the first reaction zone and hydrocarbons supplied to the first and second reaction zone is in the range of from 0.4 to 0.8.

7. The process of claim 1, wherein the first and the second gaseous stream of hydrocarbons comprise natural gas, methane, ethane, propane, LPG or a mixture of two or more thereof.

8. The process of claim 1, wherein the mixed electronic ionic conductor is a metallic oxide of the formula $ABO_{3-\delta}$, wherein A is selected from the group consisting of calcium, strontium, barium, yttrium, lanthanum, and mixtures thereof, and B is selected from the group consisting of chromium, manganese, iron, cobalt, nickel, copper, and mixtures thereof, and $\delta$ ranges from 0 to 0.5.

9. The process of claim 1, wherein the hydrogen-permeable selective membrane comprises palladium, platinum or a palladium or platinum alloy.

* * * * *